United States Patent [19]
Goldberg et al.

[11] Patent Number: 5,288,444
[45] Date of Patent: Feb. 22, 1994

[54] CONTROLLED RESISTIVITY CERAMIC FIBERS AND PROCESS FOR MAKING THEM

[75] Inventors: Harris A. Goldberg, Colonia; Ilmar L. Kalnin, West Millington; Clyde C. Williams, Roselle, all of N.J.

[73] Assignee: Hoechst Celanese Corp., Somerville, N.J.

[21] Appl. No.: 39,256

[22] Filed: Apr. 17, 1987

[51] Int. Cl.$^5$ .............................................. F27B 9/04
[52] U.S. Cl. ...................................... 264/65; 423/345
[58] Field of Search ............................ 264/56, 60, 82; 501/154, 92

[56] References Cited
U.S. PATENT DOCUMENTS 4,283,376  8/1981  Yajima et al. ................. 423/345
4,399,232  8/1983  Yajima et al. ................. 501/38

Primary Examiner—Donald P. Walsh
Assistant Examiner—John N. Greaves
Attorney, Agent, or Firm—M. W. Ferrell

[57] ABSTRACT

Ceramic fibers formed by the pyrolysis of organosilicon preceramic polymers are provided with increased resistivity by treating the fibers in air at temperatures of less than 1,000° C. to oxidize the free carbon content of the fibers.

14 Claims, No Drawings

CONTROLLED RESISTIVITY CERAMIC FIBERS AND PROCESS FOR MAKING THEM

FIELD OF THE INVENTION

This invention relates to a process for the production of ceramic fibers from organosilicon polymers. More particularly, the present invention is concerned with a process for increasing the resistivity of ceramic fibers which have been formed by the pyrolysis of organosilicon preceramic polymers and with high resistivity ceramic fibers and products formed from such high resistivity ceramic fibers.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organosilicon polymers have the potential to overcome these problems. To this end, polymers based on silicon, carbon and/or nitrogen and oxygen have been developed. See, for example, "Siloxanes, Silanes and Silazanes in the Preparation of Ceramics and Glasses" by Wills et al, and "Special Heat-Resisting Materials from Organometallic Polymers" by Yajima, in Ceramic Bulletin, Vol. 62, No. 8, pp. 893–915 (1983), and the references cited therein.

The major and most critical application for ceramics based on polymer processing is high strength, high modulus, reinforcing fibers. Such fibers are spun from organosilicon preceramic polymers and are subsequently converted to ceramic materials, in particular, silicon carbide/silicon nitride bearing fibers by a two-step process of curing to render the preceramic polymeric fibers insoluble followed by pyrolyzation comprising heating the fiber in an inert atmosphere up to about 2,000° C. whereupon the fibers are converted to ceramic form.

U.S. Pat. No. 3,853,567 is an early example of thermally treating a polysilazane resin to form ceramic articles comprising silicon carbide and/or silicon nitride. Thus, in Example 1 of the patent, a carbosilazane resin is formed, spun into filaments, the filaments rendered infusible by treating them with moist air for 20 hours at 110° C. and subsequently heated over the course of 7 hours to 1,200° C. in a nitrogen atmosphere and then to 1,500° C. over the course of 5 minutes. A black-glistening filament which is completely insensitive to oxidation at 1,200° C. and is amorphous to x-rays is disclosed as obtained. Subsequent heating to 1,800° under argon produced a fiber consisting of β-SiC, a little α-SiC and β-SiC$_3$N$_4$. Pyrolysis can be undertaken in inert gases such as nitrogen mentioned above as well as ammonia, argon or hydrogen.

Although the mechanical properties of silicon carbide fibers are not quite as good as those of high strength carbon fibers, SiC fibers will likely find increasing application in electronic components including epoxy composites therefor because such fibers are between five and six orders of magnitude less conducting than carbon fibers. This higher resistivity can be translated directly into a lower reflectivity for various forms of electromagnetic noise.

Unfortunately, the conductivity and dielectric constant of silicon carbide fibers formed from the pyrolysis of organosilicon preceramic polymers are much higher than those of crystalline silicon carbide. One possible source of this is the excess carbon in silicon carbide fibers formed by the pyrolysis of organosilicon preceramic polymers. It appears that the conduction mechanism in silicon carbide fibers is variable range hopping which may occur between poorly connected carbon rich regions. Thus, if the free carbon content of the silicon carbide fibers could be homogeneously reduced and/or the connecting paths between the carbon rich regions made more resistive on a microscopic scale, the conductivity and dielectric constant of the fibers would be further reduced.

One simple method of reducing the carbon content would be to oxidize the free carbon to carbon monoxide. However, heating silicon carbide fibers in air at temperatures of 1,000° C. and above leads to the formation of an oxide coating. Such an oxide coating limits the oxidation of the interior of the fiber and, thus, limits the oxidation of free carbon to reduce the conductivity and dielectric constant of the fibers. The oxide coating also causes significant reductions in the strength of the fiber.

On the other hand, copending, commonly assigned U.S. Ser. No. 895,420, filed August 11, 1986, has found that treating SiC fibers at temperatures above 1,000° C. in the presence of trace concentrations of oxygen while leading to the formation of an oxide coating on silicon carbide fibers, nevertheless, does not harm he mechanical properties of the fibers. Such treated fibers actually retain the weight and tensile properties of the original fibers even when aged in a severe environment of high temperature.

U.S. Pat. No. 4,283,376 discloses producing a silicon carbide fiber which is obtained from the pyrolysis of polycarbosilanes which contain borosiloxane groups. After the fibers have been pyrolyzed to the ceramic, impurities such as graphite, free carbon or silica are removed by heating the pyrolyzed fibers at a temperature of preferably 800° to 1,600° C. in an atmosphere of at least one gas selected from oxygen, air, ozone, hydrogen, steam and carbon monoxide. The patent states that when the decarbonization treatment is performed at a temperature of not more than 800° C., free carbon cannot be fully removed and that when the heating temperature exceeds 1,600° C., the reaction of SiC and the atmospheric gas takes place vigorously.

U.S. Pat. No. 4,399,232 is like the preceding patent and is concerned with forming inorganic fibers obtained from pyrolyzing organosilicon fibers which contain polycarbosilane blocks and titanoxane units. The patent states that free carbon can be removed from pyrolyzed fibers by heating the fibers in an atmosphere of at least one gas selected from the group consisting of oxygen gas, air, ozone, hydrogen gas, steam and carbon monoxide gas, preferably at a temperature of 800° to 1,600° C.

Again, this patent states upon heating below 800° C., the free carbon cannot be fully removed.

Accordingly, it would be advantageous to provide silicon carbide fibers of increased resistivity and consequently increase the uses of such fibers. Obviously, it would be advantageous to increase the resistivity of silicon carbide fibers without adversely affecting the mechanical properties of such fibers.

The primary object of the present invention is thus to increase the resistivity and lower the dielectric constant of ceramic fibers formed by the pyrolysis of organosilicon preceramic polymers and to accomplish same without adversely affecting the desirable properties of the fibers.

Another object of the invention is to reduce the free carbon content of silicon carbide fibers formed from organosilicon preceramic polymers.

Still another object of the present invention is to provide a process for oxidizing the free carbon which is in the interior of a silicon carbide fiber formed from the pyrolysis of organosilicon preceramic polymers.

Still yet another object is to produce a highly resistive silicon carbide fiber which can be used in resin composites or otherwise formed into articles which will find use in electronic applications.

These and other objects, aspects and advantages of the invention will be readily apparent to those of ordinary skill in this art upon consideration of the following description of the invention and the appended claims.

SUMMARY OF THE INVENTION

In accordance with the present invention, silicon carbide fibers formed by pyrolysis of organosilicon preceramic polymers are provided with a reduced free carbon content by oxidizing the fibers at temperatures below 1,000° C. The low temperature oxidation allows the free carbon in the interior of the fiber to be oxidized resulting in a silicon carbide fiber of greatly increased resistivity and lower dielectric constant.

The penetration of oxygen into the interior of a silicon carbide fiber occurs via Knudsen diffusion through the open porosity. At high temperatures, an oxide layer forms on the surface of the fiber because the reaction rate for the formation of $SiO_2$ is much faster than the diffusion rate of oxygen through the pores. While chemical reaction rates such as the oxidation of surface silicon depend exponentially on the temperature, the Knudsen diffusion rate depends only on the square root of the temperature. Thus, as the temperature is lowered, the reaction rate for the formation of silicon dioxide eventually becomes slower than the diffusion rate of oxygen into the pores of the fiber. At this point, the oxygen is able to homogeneously penetrate the pores of the fiber. Consequently, the silicon carbide fiber loses carbon as carbon monoxide and probably picks up oxygen as $SiO_2$. Both of these processes increase the resistivity and decrease the dielectric constant of the fiber.

DESCRIPTION OF THE PREFERRED EMBODIMENTS

Organosilicon preceramic polymers are well known in the art. Such polymers contain silicon, carbon and/or nitrogen, and oxygen, are fiber-forming, and can be cured and pyrolyzed to ceramic form. See, for example, U.S. Pat. Nos. 4,310,651; 4,312,970; 4,342,712; 4,482,689; and 4,340,619, which are incorporated herein by reference. Such polymers optionally may be modified with chemical groups to allow subsequent curing in the absence of oxygen.

These organosilicon precursor polymers may be made in a variety of ways as is known in the art. For example, they may be made by first dechlorinating an alkylchlorosilane, e.g., dimethyldichlorosilane, and polymerizing the product to form a polysilane, e.g., polydimethylsilane. This material is then heated to convert its backbone of silicon atoms to a backbone of alternating silicon and carbon atoms by forming a polycarbonsilane.

Preferably, the organosilicon preceramic polymers utilized in the present invention consist essentially of silicon, carbon, and nitrogen, and are devoid of oxygen and/or metallic pendant or backbone elements other than silicon. Such polymers are typically prepared by reacting a disilazane and a dichlorodisilane or a methylchlorodisilane.

Thus, the preferred organosilicon preceramic polymers of the present invention are characterized as polysilazanes prepared from methylchlorodisilanes and hexamethyldisilazane. Particularly preferred are the polysilazanes, containing N-Si-Si-N linkages. Another preferred polysilazane is formed by reacting trichlorosilane with hexamethyldisilazane as disclosed in U.S. Pat. No. 4,543,344 and incorporated herein by reference.

Optionally, the addition of difunctional monosilanes as co-reactants may be used to enhance spinning and/or subsequent fiber handling properties. Such difunctional monosilanes include preferably $R_1R_2SiCl_2$, where $R_1$ and $R_2$ may independently be an ethyl, phenyl or vinyl group. The organosilicon preceramic polymers may be further modified, for example, by incorporating vinyl functionality by reacting with the polymer itself. This may be achieved, for example, by co-reacting the polymer with a vinyl (Vi) halosilane such as $ViR_1R_2SiCl$, where $R_1$ and $R_2$ may each independently be methyl or phenyl.

Still another preferred type of organosilicon polymer which is thermally sensitive and which may be especially suitable in the present invention comprises a plurality of cyclic and/or linear precursor residues of the repeating units of formula I:

linked together by $Si_2N_2$ bridges of formula II,

wherein R is hydrogen, a lower alkyl group having from 1 to about 6 carbon atoms, a substituted or unsubstituted vinyl group, a substituted or unsubstituted allyl group, a substituted or unsubstituted benzyl group, a substituted or unsubstituted lower aryl group having from 6 to about 10 carbon atoms, a tri(lower) alkyl or di(lower)alkylsilyl group, a di(lower)alkylamino group, a lower alkoxy group having from 1 to about 6 carbon atoms; and n is an integer greater than one. The substituted groups are substituted with lower alkyl and lower aryl groups.

These polymers form novel ladder-like or planar array structures that are soluble in common organic solvents, stable at room temperature and thermally stable up to about 550° C. The ladder-like or planar array polymers of the present invention are formed in high yield by reaction of the cyclic and/or linear residues in the presence of a basic catalyst capable of deprotonating an NH function adjacent to silicon. These polymers and their preparation are described more fully in U.S. Pat. No. 4,482,669 to Seyferth et al, assigned on its face to Massachusetts Institute of Technology, which patent is herein incorporated by reference.

Molecular weight ($M_n$) for the above organosilicon preceramic polymers may vary from about 500 to 20,000 preferably about 700 to 5,000, and most preferably 1,000 to 2,000 (g/mole-GPC method). These polymers may also have softening temperatures ($T_s$) of about 50° C. to 308° C., preferably about 60° C. to 200° C., and most preferably 70° C. to 150° C.

The organosilicon preceramic polymers once formed are spun into fibers using any conventional melt spinning or dry spinning process. To melt spin, the solid organosilicon polymer is melted at a temperature and rate sufficient to avoid gelation and foaming, and substantially immediately thereafter the melted polymer is spun into fiber using a suitable spinning apparatus.

A relatively short residence time of the organosilicon polymer in the melt is desirable to achieving strong, fine diameter fibers. If an organosilicon polymer blend is brought up to a melt-processable or extrudable temperature and held at such temperatures for too long a period of time, gelation will occur, which in turn will lead to the presence of noticeable flaws in the fiber and a concomitant loss of tensile properties. In addition, the melt temperature of the organosilicon polymer melt should be less than that which would cause foaming of the polymer, which foaming will also lead to the presence of voids or flaws in the fiber. The typical organosilicon polymer is significantly more melt sensitive as compared to other conventional fiber-forming polymers, e.g., polyethylene terephthalate.

While allowable total melt residence time may vary from one particular organosilicon polymer melt to another, in general the total melt residence time should be less than thirty minutes, e.g., about one to twenty minutes, preferably less than about 10 minutes, and most preferably less than five minutes.

The actual melt temperatures of the respective polymer melts may vary, but will generally be above the softening temperature ($T_s$) of the polymers, but below that at which foaming, gelation or other degradation occurs within the total melt residence time. Typically, such melt temperatures will range from about 30 to 130, preferably from about 50 to 100, and most preferably 60° to 80° C. above the $T_s$ of each polymer.

If desired, the organosilicon polymer may be blended with another thermoplastic polymer to improve the spinning properties. Suitable polymers for blending can be selected generally from various types which improve the processability of the organosilicon preceramic fiber. The polymers blended should be mutually compatible, physically, and chemically. In other words, the melting points of the polymers used in the melt blend should be comparable. The combined polymers can thus be melted to form a homogenous blend having a suitable viscosity for spinning without approaching temperatures at which the thermally sensitive organosilicon polymer might tend to cross-link or any of the additional polymers might reach decomposition temperature. The polymer should not form separate phases when blended together in melts or solutions, and should not react with or otherwise degrade each other. Some compatible resins include vinyl polymers and copolymers, diolefin polymers, polyethers, polythioethers, polyesters, polyamides and polypeptides.

To dry spin, the solid organosilicon polymer is dissolved in a suitable solvent at suitable polymer solids concentrations and spun on conventional dry spinning apparatus. Solvents with relatively low boiling points are preferred to permit the efficient extraction of solvent from the spun fibers without adversely affecting the organosilicon polymer. Particularly preferred solvents are toluene and xylene. Relatively high solids concentrations of the organosilicon polymer in the spinning solution is important to achieve a self supporting threadline with these relatively low-molecular weight, highly branched organosilicon polymers. Typical polymer solids concentrations of at least about 70 to about 80% are useful. Again, a compatible polymer which can be dissolved may be added to the spinning solution of organosilicon preceramic polymer to improve spinning properties.

After spinning, the preceramic fibers are typically cured or cross-linked and thereafter pyrolyzed to ceramic form.

Effective curing conditions are defined as those curing conditions after which the organosilicon preceramic fibers become infusible and the fibers may be pyrolyzed without melting or fusing together. A variety of curing methods may be used. These include oxidative and hydrolytic cures, reactive cures, thermal cures, and radiolytic cures. The presently preferred method of curing is via an oxidative/hydrolytic cure. Typically, this entails heating the fibers in a controlled humidity environment, where humidity can range from about 8 to 100%.

Curing may be carried out at temperatures from about 50°–400° C., the rate of curing increasing as the temperature increases.

The cured preceramic fibers are then pyrolyzed at about 1200° C. to convert the fibers to ceramic form. Typical heating rates during pyrolyzation comprise about 3° C. per minute from room temperature up to about 1100°–1200° C. Pyrolyzation is typically carried out in an inert atmosphere such as nitrogen, argon, or in a vacuum.

In accordance with the present invention, the ceramic fibers are subsequently treated in an oxidizing atmosphere to oxidize the free carbon which is present in the fibers, in particular, in the interior of the fibers. Thus, the fibers are treated in an oxidizing atmosphere at a temperature which increases the rate of oxygen diffusion into the pores of the fiber over the reaction rate for the formation of silicon dioxide on the surface of the fibers. Thus, the free carbon in the interior of the fiber is not insulated from the oxidizing agent and is believed to be oxidized with consequent reduction of fiber conductivity. Specifically, the silicon carbide fibers are treated in an oxidizing atmosphere at temperatures less than 1,000° C., and preferably at temperatures in the range of about 400° to 750° C. and, more preferably, from about 500°–600° C.

The oxidizing atmosphere can be selected from among a variety of oxidizing agents including $O_2$, air, ozone, steam, etc. The oxidizing atmosphere may include the oxidizing agent only, such as pure $O_2$ or air, or the oxidizing agent may be diluted in an inert gas such as argon, nitrogen, etc. In view of the low temperatures, i.e., less than 1000° C., the time of treatment will be relatively long exceeding at least about 20 hours and even greater than 40 hours. Treatment times up to 75 and up to 300 hours may be necessary depending on treatment temperatures.

The result of the oxidizing treatment is a vast increase in fiber resistivity and lower dielectric constant in view of the reduced free carbon content in the interior of the fibers as well as the possible formation of an oxide skin on the fiber surface from the oxidation of surface Si atoms. Thus, increased DC resistance and microwave resistivity has been shown in the treated fibers. Importantly, the mechanical properties of the treated fibers remain unchanged. The treated fibers have been shown to maintain their elastic and strength properties.

The treated fibers as described herein can be formed into fabrics, prepregs and fiber-polymer composites. The fiber-containing structures have use in electronic applications because fibers of increased resistivity will not be a cause of electric interference. Moreover, the ceramic fiber-containing structures have use in shielding articles from a variety of electromagnetic noise.

Besides fibers, the invention contemplates reducing the conductivity of all ceramic articles which have been formed by shaping organosilicon preceramic polymers and subsequently pyrolyzed. Thus, increased resistivity sheets, films, fibers, etc., are contemplated by this invention. Moreover, any porous ceramic article containing free carbon can be treated by the process of this invention to oxidize such free carbon and provide a ceramic article of increased resistivity.

The following examples are given to illustrate the present invention in more detail. It should be noted that the invention is not to be construed as being strictly limited to these examples.

EXAMPLE 1

Samples of silicon carbide fibers were placed in a Lindberg furnace and heated in air for 49 hours at various temperatures. All samples were taken from the same spool of silicon fibers which were formed by pyrolyzing polycarbosilane fibers ("Nicalon" fibers produced by Nippon Carbon Co., Ltd., Tokyo, Japan and distributed by Dow Corning Corp., Midland, Michigan). Table 1 summarizes the results with regard to mechanical properties and electric resistivity of the fibers. Each control sample was taken from an adjacent piece of yarn relative to the piece which was processed by the low temperature oxidation. The mechanical properties shown are the average value of 20 single filaments.

TABLE 1

| SAMPLE NO. | PROCESS | TENSILE BREAK (KPSI) | RESISTIVITY (ohm-cm) |
|---|---|---|---|
| 1 | 400° C. Airbake | 275 | $1 \times 10^3$ |
|   | Control | 253 | $5 \times 10^2$ |
| 2 | 500° C. Airbake | 391 | $9 \times 10^3$ |
|   | Control | 334 | $2 \times 10^2$ |
| 3 | 600° C. Airbake | 352 | $3 \times 10^4$ |
|   | Control | 395 | $3 \times 10^3$ |
| 4 | 500° C. Airbake | 401 | — |
|   | Control | 312 | — |

As can be seen, the resistivity of the control samples was largely increased by the low temperature oxidation treatment of the present invention. Moreover, in most cases the strength of the fiber was maintained and increased.

EXAMPLE 2

Samples of ceramic fibers obtained from three types of organosilicon preceramic polymers were heat treated in air at 500° C. at 50 hours and 300 hours. Thus, Samples A were Nicalon fibers as in Example 1. Samples B were fibers obtained from the pyrolysis of organosilicon fibers prepared by the reaction of methylchlorodisilane and hexamethyldisilazane while Samples C were fibers obtained from organosilicon polymers produced by reacting trichlorosilane with hexamethyldisilazane. The mechanical properties as well as the electrical properties of the heat treated samples and controls (no heat treatment) are shown in Tables 2 and 3. As can be seen from Table 2, the mechanical properties of the heat treated samples although varied, do not differ significantly from the controls. On the other hand, the resistivity of the heat treated samples was substantially increased as illustrated in Table 3.

TABLE 2

| | | Tensile | | |
| | | Break | | Modulus |
| Sample No. | Heat Treatment at 500° C. (hr) | PSI (K) | ELONG % | PSI (KK) |
|---|---|---|---|---|
| A | 0 | 435.824 | 1.7638 | 28.2303 |
| A | 50 | 406.594 | 1.6105 | 28.7872 |
| A | 300 | 336.287 | 1.3208 | 27.8055 |
| B | 0 | 227.416 | 0.92103 | 25.6239 |
| B | 50 | 233.122 | 1.0121 | 23.8831 |
| B | 300 | 166.658 | 0.74422 | 23.1670 |
| C | 0 | 218.194 | 1.0039 | 23.4144 |
| C | 50 | 169.629 | 0.77862 | 23.3711 |
| C | 300 | 205.756 | 0.98581 | 22.3937 |

TABLE 3

| Sample No. | Heat Treatment 500° C. (hr) | Resistivity (ohm-cm) |
|---|---|---|
| A | 0 | $5.3 \times 10^2$ |
| A | 50 | $2.9 \times 10^3$ (1) |
| A | 300 | $3.6 \times 10^4$ |
| B | 0 | $6.4 \times 10^4$ |
| B | 50 | $11.6 \times 10^4$ |
| B | 300 | $19.0 \times 10^4$ (1) |
| C | 0 | $3.0 \times 10^5$ (2) |
| C | 50 | $1.6 \times 10^5$ (2) |
| C | 300 | $10.6 \times 10^5$ (1) |

(1) Average of 9 values
(2) Average of 8 values
All others average of 10 values obtained from testing

What is claimed is:

1. A process for increasing the resistivity of ceramic fibers which have been formed by pyrolyzing a fiber spun from an organosilicon preceramic polymer devoid of pendant or backbone oxygen comprising: contacting said ceramic fiber with an oxidizing agent at temperatures of about 400°–750° C. for a period of time sufficient to reduce the free carbon content of said fibers and provide a silicon carbide fiber of increased electric resistivity.

2. The process of claim 1 wherein said oxidizing agent is air.

3. The process of claim 1 wherein said fibers are heated to a temperature of about 500°–600° C.

4. A process for manufacturing highly resistive ceramic articles comprising: pyrolyzing an article shaped from an organosilicon preceramic polymer devoid of pendant or backbone oxygen to yield a ceramic article and subsequently treating said ceramic article in an oxidizing atmosphere at temperatures of about 400°–750° C. for a period of time sufficient to reduce the free carbon content of said ceramic article and provide a ceramic article of increased electric resistivity.

5. The process of claim 4 wherein said shaped article is in the form of a sheet, film, or fiber.

6. The process of claim 5 wherein said article is shaped into a fiber by melt spinning said organosilicon preceramic polymer.

7. The process of claim 5 wherein said article is shaped into a fiber by dry spinning said organosilicon preceramic polymer.

8. The process of claim 5 wherein the shaped polymer article is cured to render said polymer infusible prior to pyrolysis.

9. The process of claim 4 wherein said ceramic article is heated to a temperature of about 500°–600° C. in said oxidizing atmosphere.

10. The process of claim 4 wherein said organosilicon preceramic polymer is formed by reacting methylchlorodisilane with a disilazane.

11. The process of claim 4 wherein said organosilicon preceramic polymer is formed by reacting trichlorosilane with a disilazane.

12. The process of claim 10 wherein said disilazane is hexamethyldisilazaine.

13. The process of claim 11 wherein said disilazane is hexamethyldisilazaine.

14. The process of claim 4 wherein said organosilicon preceramic polymer is a polycarbosilane.

* * * * *